United States Patent
Zhang

(10) Patent No.: US 9,250,723 B2
(45) Date of Patent: Feb. 2, 2016

(54) METHOD AND APPARATUS FOR STROKE ACQUISITION AND ULTRASONIC ELECTRONIC STYLUS

(71) Applicant: Lenovo (Beijing) Co., Ltd., Beijing (CN)

(72) Inventor: Xueyuan Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/228,649

(22) Filed: Mar. 28, 2014

(65) Prior Publication Data

US 2015/0116288 A1    Apr. 30, 2015

(30) Foreign Application Priority Data

Oct. 29, 2013   (CN) .......................... 2013 1 0521880

(51) Int. Cl.
*G06F 3/0354*   (2013.01)
*G06F 3/043*    (2006.01)

(52) U.S. Cl.
CPC ............ *G06F 3/03545* (2013.01); *G06F 3/043* (2013.01)

(58) Field of Classification Search
CPC ... G06F 3/033; G06F 3/0354; G06F 3/03545; G06F 2203/04101; G06F 3/0317; G06F 3/03542; G06F 3/0386; G06F 3/043–3/0436
See application file for complete search history.

(56) References Cited

U.S. PATENT DOCUMENTS

| | | | |
|---|---|---|---|
| 6,373,003 B1 * | 4/2002 | Holtzman | 178/19.01 |
| 2002/0176577 A1 * | 11/2002 | Xu | 380/258 |
| 2004/0150631 A1 * | 8/2004 | Fleck et al. | 345/179 |
| 2004/0160429 A1 * | 8/2004 | Blake et al. | 345/179 |
| 2004/0201580 A1 * | 10/2004 | Fujiwara et al. | 345/179 |
| 2006/0290682 A1 * | 12/2006 | Ake | 345/173 |
| 2012/0139863 A1 * | 6/2012 | Lee | 345/173 |
| 2012/0169726 A1 * | 7/2012 | Flament et al. | 345/419 |
| 2013/0033461 A1 * | 2/2013 | Silverbrook | 345/179 |
| 2014/0010453 A1 * | 1/2014 | Xu | 382/188 |
| 2014/0253442 A1 * | 9/2014 | Eruchimovitch | 345/158 |
| 2015/0116285 A1 * | 4/2015 | Kling | 345/179 |

* cited by examiner

*Primary Examiner* — Larry Sternbane
*Assistant Examiner* — Ivelisse Martinez Quiles
(74) *Attorney, Agent, or Firm* — Harness, Dickey & Pierce, P.L.C.

(57) ABSTRACT

A method and apparatus for stroke acquisition, and an ultrasonic electronic stylus are provided. The method is applied to the ultrasonic electronic stylus. In the case that the ultrasonic electronic stylus contacts with a writing board and a pressure generated on the writing board by the ultrasonic electronic stylus reaches a first predetermined value, the ultrasonic electronic stylus is controlled to generate a first signal so that a signal receiver of an electronic device acquires a first stroke based on the first signal. After the first signal is generated, an operation parameter of the ultrasonic electronic stylus is adjusted. In the case that the pressure is smaller than the first predetermined value and a preset condition is satisfied, a second signal is generated so that the electronic device continues to acquire a second stroke based on the second signal.

11 Claims, 4 Drawing Sheets

METHOD AND APPARATUS FOR STROKE ACQUISITION AND ULTRASONIC ELECTRONIC STYLUS

CROSS REFERENCES OF RELATED APPLICATION

The present application claims the priority to Chinese Patent Application No. 201310521880.2, entitled "METHOD AND APPARATUS FOR STOKE ACQUISITION AND ULTRASONIC ELECTRONIC STYLUS", filed on Oct. 29, 2013 with the State Intellectual Property Office of People's Republic of China, which is incorporated herein by reference in its entirety.

FIELD

The disclosure relates to the field of electronic device, and particularly, to a method for stroke acquisition, an apparatus for stroke acquisition and an ultrasonic electronic stylus.

BACKGROUND

With the development of technologies, electronic devices have more and more functions in life of people. For some electronic devices such as laptop computer, etc., a use may use a keyboard to input information. Alternatively, an ultrasonic electronic stylus may be utilized for inputting information into the electronic device.

Conventionally, in the case that the ultrasonic electronic stylus is utilized for inputting information into the electronic device, a pressure sensor is provided at the nib of the ultrasonic electronic stylus. When a user writes, if it is detected by the pressure sensor that a pressure generated on a writing board of the electronic device by the ultrasonic electronic stylus reaches a predetermined value, the ultrasonic electronic stylus starts to generate a signal. The electronic device may acquire locations of the ultrasonic electronic stylus with a signal receiver, thereby acquiring a corresponding stroke generated by the ultrasonic electronic stylus.

However, the inventor finds during research that, when a conventional method is used for stroke acquisition, since the user generally writes with a small force at the end of the stroke, the pressure sensed by the pressure sensor does not reach the predetermined value. Therefore, data for the end of the stroke is lost, and accordingly, the accuracy of stroke acquisition is low.

SUMMARY

Accordingly, a method for stroke acquisition, an apparatus for stroke acquisition and an ultrasonic electronic stylus are provided in the disclosure, for improving the accuracy of stroke acquisition. Technical solutions are as follows.

A method for stroke acquisition is provided in the disclosure. The method for stroke acquisition is applied to an ultrasonic electronic stylus. The ultrasonic electronic stylus is adapted to write on a writing board, and a pressure sensor is provided at the nib of the ultrasonic electronic stylus. The method for stroke acquisition includes the following steps:

in the case that the ultrasonic electronic stylus contacts with the writing board, detecting whether a pressure generated on the writing board by the ultrasonic electronic stylus reaches a first predetermined value, and in the case that the pressure generated on the writing board by the ultrasonic electronic stylus reaches the first predetermined value, controlling the ultrasonic electronic stylus to generate a first signal, so that a signal receiver of an electronic device receives the first signal and acquires, based on the received first signal, a first stroke generated by the ultrasonic electronic stylus on the writing board;

adjusting an operation parameter of the ultrasonic electronic stylus after the first signal is generated, where the operation parameter includes a threshold of the pressure sensor and/or a duration of a generated signal; and in the case that the pressure generated on the writing board by the ultrasonic electronic stylus is smaller than the first predetermined value, judging whether a preset condition is satisfied and controlling the ultrasonic electronic stylus to continue to generate a second signal if the preset condition is satisfied, so that the electronic device continues to acquire a second stroke based on the second signal.

In the case that the operation parameter subjected to adjusting is the threshold of the pressure sensor, judging whether the preset condition is satisfied and controlling the ultrasonic electronic stylus to continue to generate the second signal if the preset condition is satisfied include:

in the case that the pressure generated on the writing board by the ultrasonic electronic stylus is smaller than the first predetermined value, judging whether the pressure generated on the writing board by the ultrasonic electronic stylus reaches a second predetermined value, the second predetermined value being smaller than the first predetermined value; and if the pressure generated by the ultrasonic electronic stylus reaches the second predetermined value, controlling the ultrasonic electronic stylus to continue to generate the second signal, so that the electronic device continues to acquire the second stroke based on the second signal.

Alternatively, in the case that the operation parameter subjected to adjusting is the duration of the generated signal, judging whether the preset condition is satisfied and controlling the ultrasonic electronic stylus to continue to generate the second signal if the preset condition is satisfied include:

in the case that the pressure generated on the writing board by the ultrasonic electronic stylus is smaller than the first predetermined value, judging whether a duration of the second signal generated by the ultrasonic electronic stylus reaches a set duration; and if the duration of the second signal generated by the ultrasonic electronic stylus does not reach the set duration, controlling the ultrasonic electronic stylus to continue generating the second signal, so that the electronic device continues to acquire the second stroke based on the second signal.

In the case that the signal receiver of the electronic device includes an infrared signal receiver and an ultrasonic signal receiver, the first signal and the second signal include an infrared signal and an ultrasonic signal.

Alternatively, in the case that the signal receiver of the electronic device is an ultrasonic signal receiver, the first signal and the second signal are ultrasonic signals.

After the operation parameter of the ultrasonic electronic stylus is adjusted, the method further includes:

detecting whether there is the pressure generated on the writing board by the ultrasonic electronic stylus, and in the case that there is no pressure generated on the writing board by the ultrasonic electronic stylus, restoring the operation parameter of the ultrasonic electronic stylus to an original state.

Accordingly, an apparatus for stroke acquisition is further provided in the disclosure. The apparatus for stroke acquisition is applied to an ultrasonic electronic stylus. The ultrasonic electronic stylus is adapted to write on a writing board, and a pressure sensor is provided at the nib of the ultrasonic electronic stylus. The apparatus for stroke acquisition includes a first signal generation module, an operation parameter adjustment module and a second signal generation module.

The first signal generation module is adapted to, in the case that the ultrasonic electronic stylus contacts with the writing board, detect whether a pressure generated on the writing board by the ultrasonic electronic stylus reaches a first predetermined value, and in the case that the pressure generated on the writing board by the ultrasonic electronic stylus reaches the first predetermined value, control the ultrasonic electronic stylus to generate a first signal, so that a signal receiver of an electronic device receives the first signal and acquires, based on the received first signal, a first stroke generated by the ultrasonic electronic stylus on the writing board.

The operation parameter adjustment module is adapted to adjust an operation parameter of the ultrasonic electronic stylus after the first signal is generated. The operation parameter includes a threshold of the pressure sensor and/or a duration of a generated signal.

The second signal generation module is adapted to, in the case that the pressure generated on the writing board by the ultrasonic electronic stylus is smaller than the first predetermined value, judge whether a preset condition is satisfied and control the ultrasonic electronic stylus to continue to generate a second signal if the preset condition is satisfied, so that the electronic device continues to acquire a second stroke according to the second signal.

In the case that the operation parameter adjusted by the operation parameter adjustment module is the threshold of the pressure sensor, the second signal generation module includes:

a second predetermined value judgment unit, adapted to, in the case that the pressure generated on the writing board by the ultrasonic electronic stylus is smaller than the first predetermined value, judge whether the pressure generated on the writing board by the ultrasonic electronic stylus reaches a second predetermined value, the second predetermined value being smaller than the first predetermined value; and a second signal generation unit, adapted to control the ultrasonic electronic stylus to continue to generate the second signal if the pressure generated by the ultrasonic electronic stylus reaches the second predetermined value, so that the electronic device continues to acquire the second stroke according to the second signal.

Alternatively, in the case that the operation parameter adjusted by the operation parameter adjustment module is the duration of the generated signal, the second signal generation module includes:

a duration judgment unit adapted to, in the case that the pressure generated on the writing board by the ultrasonic electronic stylus is smaller than the first predetermined value, judge whether a duration of the second signal generated by the ultrasonic electronic stylus reaches a set duration; and a second signal generation unit, adapted to control the ultrasonic electronic stylus to continue generating the second signal if the duration of the second signal generated by the ultrasonic electronic stylus does not reach the set duration, so that the electronic device continues to acquire the second stroke based on the second signal.

The apparatus for stroke acquisition further includes:

a restoring module, adapted to detect whether there is a pressure generated on the writing board by the ultrasonic electronic stylus, and in the case that there is no pressure generated on the writing board by the ultrasonic electronic stylus, restore the operation parameter of the ultrasonic electronic stylus to an original state.

Accordingly, an ultrasonic electronic stylus is further provided in the disclosure. The above-described apparatus for stroke acquisition is integrated in a processor of the ultrasonic electronic stylus.

The method for stroke acquisition applied to the ultrasonic electronic stylus is provided in the disclosure. The ultrasonic electronic stylus is adapted to write on the writing board, and the pressure sensor is provided at the nib of the ultrasonic electronic stylus. In the method, in the case that the ultrasonic electronic stylus contacts with the writing board, it is detected whether the pressure generated on the writing board by the ultrasonic electronic stylus reaches the first predetermined value, and in the case that the pressure generated on the writing board by the ultrasonic electronic stylus reaches the first predetermined value, the ultrasonic electronic stylus is controlled to generate the first signal, so that the signal receiver of the electronic device receives the first signal and acquires, based on the received first signal, the first stroke generated by the ultrasonic electronic stylus on the writing board. The operation parameter of the ultrasonic electronic stylus is adjusted after the first signal is generated. The operation parameter includes the threshold of the pressure sensor and/or the duration of the generated signal. In the case that the pressure generated on the writing board by the ultrasonic electronic stylus is smaller than the first predetermined value, it is judged whether the preset condition is satisfied and the ultrasonic electronic stylus is controlled to continue to generate the second signal if the preset condition is satisfied, so that the electronic device continues to acquire the second stroke based on the second signal.

When the method is used in performing stroke acquisition, since the operation parameter of the ultrasonic electronic stylus is adjusted after the first signal is generated, in the case that the pressure generated on the writing board by the ultrasonic electronic stylus is smaller than the first predetermined value, the ultrasonic electronic stylus may nevertheless be controlled to continue to generate the second signal, so that the electronic device continues to acquire the second stroke corresponding to the second signal. Therefore, loss of stroke data is avoided, and accordingly, the accuracy of stroke acquisition is improved.

Furthermore, in the case that there is no pressure generated on the writing board by the ultrasonic electronic stylus, it is determined that a current writing operation is completed temporarily. The operation parameter of the ultrasonic electronic stylus is adjusted to the original state. Therefore, unnecessary input of stroke data is avoided, and accordingly, the accuracy of stroke acquisition is further improved.

BRIEF DESCRIPTION OF THE DRAWINGS

For more clearly illustrating technical solutions according to embodiments of the disclosure or technical solutions in existing technologies, drawings to be used in description of the embodiments of the disclosure or the existing technologies are briefly introduced hereinafter. Obviously, the drawings in the following description are merely exemplary, and other drawings may be obtained based on the drawings by those skilled in the art without any creative works.

DETAILED DESCRIPTION OF EMBODIMENTS

Technical solutions according to embodiments of the disclosure are described clearly and completely hereinafter in conjunction with drawings used in the embodiments of the disclosure. Apparently, described embodiments are merely part of, rather than all of the embodiments of the disclosure. Any other embodiment obtained by those skilled in the art based on the embodiments of the disclosure without any creative efforts should fall in the protection scope of the disclosure.

To solve existing problems that it is likely to lose data for the end of a stroke during acquiring the stroke of an electronic stylus and accordingly the accuracy of stoke acquisition is low, a method for stroke acquisition, an apparatus for stroke acquisition and an ultrasonic electronic stylus are provided in the disclosure. The method and the apparatus are applied to the ultrasonic electronic stylus. Implementation of the disclosure may be referred to the following embodiments.

A First Embodiment

Figure 1:
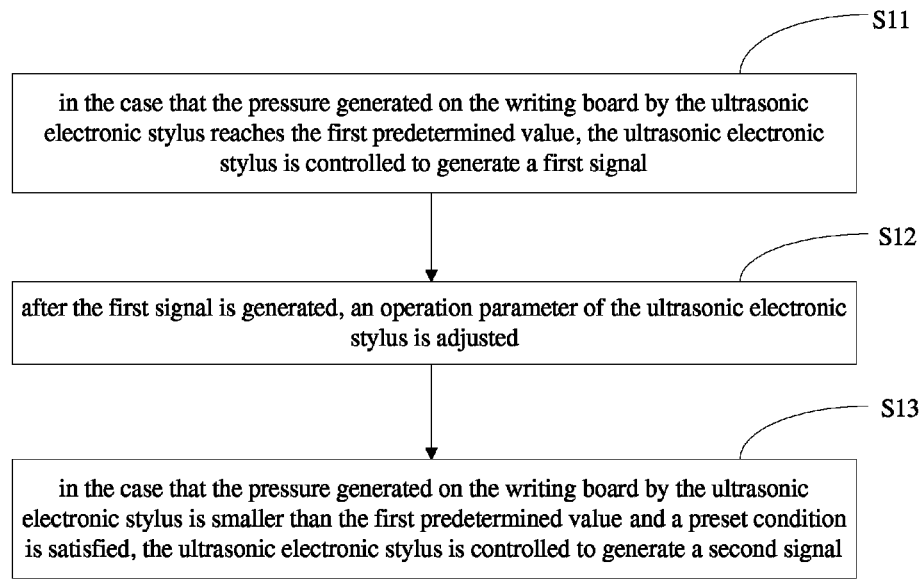
FIG. 1 is a schematic flowchart of a method for stroke acquisition according to an embodiment of the disclosure.

A method for stroke acquisition is provided in disclosure. The method for stroke acquisition is applied to an ultrasonic electronic stylus. The ultrasonic electronic stylus is adapted to write on a writing board, and a pressure sensor is provided at the nib of the ultrasonic electronic stylus. Referring to the schematic flowchart of FIG. 1, the method for stroke acquisition includes steps S11, S12 and S13.

In the step S11, in the case that the ultrasonic electronic stylus contacts with the writing board, it is detected whether a pressure generated on the writing board by the ultrasonic electronic stylus reaches a first predetermined value, and in the case that the pressure generated on the writing board by the ultrasonic electronic stylus reaches the first predetermined value, the ultrasonic electronic stylus is controlled to generate a first signal, so that a signal receiver of an electronic device receives the first signal and acquires, based on the received first signal, a first stroke generated on the writing board by the ultrasonic electronic stylus.

The ultrasonic electronic stylus is provided with a pressure sensor at the nib of the ultrasonic electronic stylus. In the case that the ultrasonic electronic stylus contacts with the writing board, the pressure sensor generates a corresponding pressure value and transmits the pressure value to a processor of the ultrasonic electronic stylus. The processor judges, based on the received pressure value, whether the pressure generated on the writing board by the ultrasonic electronic stylus reaches the first predetermined value.

In the case that the pressure generated on the writing board by the ultrasonic electronic stylus reaches the first predetermined value, it is indicated that a force exerted on the ultrasonic electronic stylus by the user is large enough, and the user is writing with the ultrasonic electronic stylus. In this situation, the ultrasonic electronic stylus is controlled to generate the first signal.

The electronic device has a display screen, and the signal receiver is provided on the display screen. After the ultrasonic electronic stylus generates the first signal, the signal receiver determines, based on the received first signal, locations where the nib of the ultrasonic electronic locates on the writing board, and determines, based on the locations, the first stroke generated by the ultrasonic electronic stylus on the writing board.

In the step S12, after the first signal is generated, an operation parameter of the ultrasonic electronic stylus is adjusted. The operation parameter includes a threshold of the pressure sensor and/or a duration of the generated signal.

In the step S13, in the case that the pressure generated on the writing board by the ultrasonic electronic stylus is smaller than the first predetermined value, it is determined whether a preset condition is satisfied, and the ultrasonic electronic stylus is controlled to continue to generate a second signal if the preset condition is satisfied, so that the electronic device continues to acquire a second stroke based on the second signal.

When writing, the user generally writes with a small force at the end of the stroke, and accordingly, the pressure sensed by the pressure sensor provided at the nib often does not reach the first predetermined value. In order to avoid loss of data for the end of the stroke in this situation, the threshold of the pressure sensor is adjusted after the first signal is generated, to control the ultrasonic electronic stylus to continue to generate the second signal in the case that the pressure sensed by the pressure sensor is small.

Alternatively, in order to avoid data loss, the duration of the signal generated by the ultrasonic electronic stylus may be adjusted. In this situation, if it is detected that the pressure generated on the writing board by the ultrasonic electronic stylus does not reach the first predetermined value, timing is started to make the duration of the signal generated by the ultrasonic electronic stylus reach a set duration. Therefore, in the case that the force exerted on the ultrasonic electronic stylus by the user is small, the ultrasonic electronic stylus can still continue to generate the second signal for some time.

Similarly, after the second signal is generated, the signal receiver may receive the second signal, determine, based on the received second signal, locations where the nib of the ultrasonic electronic stylus is in contact with the writing board, and determine, based on the locations, the second stroke generated by the ultrasonic electronic stylus on the writing board.

The method for stroke acquisition is provided in the disclosure. The method is applied to the ultrasonic electronic stylus. The ultrasonic electronic stylus is adapted to write on the writing board, and the pressure sensor is provided at the nib of the ultrasonic electronic stylus. In the method, in the case that the ultrasonic electronic stylus contacts with the writing board, it is detected whether the pressure generated on the writing board by the ultrasonic electronic stylus reaches the first predetermined value, and in the case that the pressure generated on the writing board by the ultrasonic electronic stylus reaches the first predetermined value, the ultrasonic electronic stylus is controlled to generate the first signal, so that the signal receiver of the electronic device receives the first signal and acquires, based on the received first signal, the first stroke generated by the ultrasonic electronic stylus on the writing board. The operation parameter of the ultrasonic electronic stylus is adjusted after the first signal is generated. The operation parameter includes the threshold of the pressure sensor and/or the duration of the generated signal. In the case that the pressure generated on the writing board by the ultrasonic electronic stylus is smaller than the first predetermined value, it is judged whether the preset condition is satisfied, and if the preset condition is satisfied, the ultrasonic electronic stylus is controlled to continue to generate the second signal, so that the electronic device continues to acquire the second stroke based on the second signal.

In the stroke acquisition with the method, since the operation parameter of the ultrasonic electronic stylus is adjusted after the first signal is generated, in the case that the pressure generated on the writing board by the ultrasonic electronic stylus is smaller than the first predetermined value, the ultrasonic electronic stylus may nevertheless be controlled to continue to generate the second signal, so that the electronic device continues to acquire the second stroke corresponding to the second signal. Hence, loss of stroke data is avoided, and accordingly, the accuracy of stroke acquisition is improved.

Furthermore, the operations of step S13 vary according to different types of the adjusted operation parameter of the ultrasonic electronic stylus. In the case that the operation parameter subjected to adjusting is the threshold of the pressure sensor, if the pressure generated on the writing board by the ultrasonic electronic stylus is smaller than the first predetermined value, judging whether the preset condition is satisfied and controlling the ultrasonic electronic stylus to continue to generate the second signal if the preset condition is satisfied include:

in the case that the pressure generated on the writing board by the ultrasonic electronic stylus is smaller than the first predetermined value, judging whether the pressure generated on the writing board by the ultrasonic electronic stylus reaches a second predetermined value, where the second predetermined value is smaller than the first predetermined value; and if the pressure generated by the ultrasonic electronic stylus reaches the second predetermined value, controlling the ultrasonic electronic stylus to continue to generate the second signal, so that the electronic device continues to acquire the second stroke according to the second signal.

Generally, the user writes with a small force at the end of the stroke, and accordingly, the pressure generated on the writing board by the ultrasonic electronic stylus may not reach the first predetermined value. To avoid loss of stroke data, the threshold of the pressure sensor is adjusted, so that the second signal is generated in the case that the pressure generated by the ultrasonic electronic stylus reaches the second predetermined value which is smaller than the first predetermined value.

With the above solution, in the case that the pressure generated on the writing board by the ultrasonic electronic stylus reaches the second predetermined value, it is indicated that the preset condition is satisfied, and the ultrasonic electronic stylus is controlled to continue to generate the second signal. Therefore, loss of stroke data is avoided, and accordingly, the accuracy of stroke acquisition is improved.

Alternatively, in the case that the operation parameter subjected to adjusting is the duration of the generated signal, judging whether the preset condition is satisfied and controlling the ultrasonic electronic stylus to continue to generate the second signal if the preset condition is satisfied includes:

in the case that the pressure generated on the writing board by the ultrasonic electronic stylus is smaller than the first predetermined value, judging whether the duration of the second signal generated by the ultrasonic electronic stylus reaches the set duration; and if the duration of the second signal generated by the ultrasonic electronic stylus does not reach the set duration, controlling the ultrasonic electronic stylus to continue generating the second signal, so that the electronic device continues to acquire the second stroke based on the second signal.

In this situation, the duration of the generated signal is set according to user requirements. In the case that the pressure generated on the writing board by the ultrasonic electronic stylus is smaller than the first predetermined value, timing is started, and before the duration of the generated signal reaches the set duration, the ultrasonic electronic stylus is controlled to continue generating the second signal. Therefore, in the case that the pressure generated on the writing board by the ultrasonic electronic stylus is smaller than the first predetermined value, the ultrasonic electronic stylus may nevertheless continue to generate the second signal, thereby avoiding the loss of stroke data and improving the accuracy of stroke acquisition.

Figure 2:
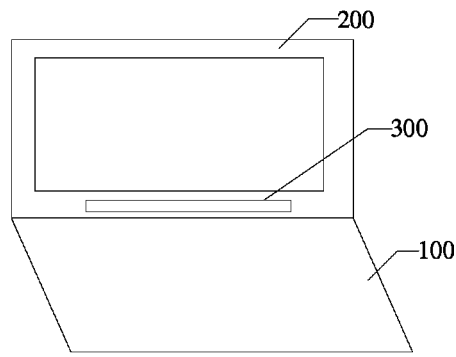
FIG. 2 is a schematic structural diagram of an existing electronic device.

Referring to the schematic structural diagram of an electronic device as shown in FIG. 2, the electronic device includes a keyboard 100, a display screen 200, and a signal receiver 300. The signal receiver 300 is provided on the display screen 200, and is adapted to receive a signal generated by the ultrasonic electronic stylus.

In the case that the signal receiver of the electronic device includes infrared signal receiver and ultrasonic signal receiver, the first signal and the second signal include infrared signal and ultrasonic signal.

For example, the signal receiver includes one infrared signal receiver and two ultrasonic signal receivers, and each of the first signal and the second signal includes both the infrared signal and the ultrasonic signal. Since the infrared signal propagates in air with the velocity of light and the ultrasonic signal propagates in air with the velocity of sound, after the infrared signal is received by the infrared signal receiver, a moment at which the infrared signal is received is determined as a moment at which the first signal or the second signal is generated. Then, after the ultrasonic signal is received by the two ultrasonic signal receivers, respective distances from the nib to the two ultrasonic signal receivers may be determined based on respective moments at which the two ultrasonic signal receivers receive the ultrasonic signal and the velocity of sound. Since a distance between the two ultrasonic signal receivers is known, locations of the strokes on the writing board may be determined based on the triangulation principle. Therefore, the first stroke and the second stroke are determined.

Alternatively, in the case that the signal receiver of the electronic device is ultrasonic signal receiver, the first signal and the second signal are ultrasonic signals.

For example, the signal receiver includes three ultrasonic signal receivers, and distances between individual ultrasonic signal receivers are known.

In the case that the first signal or the second signal is generated, since the first signal or the second signal is the ultrasonic signal, all the three ultrasonic signal receivers may receive the ultrasonic signal. Time intervals between respective moments at which the three ultrasonic signal receivers receive the ultrasonic signal may also be acquired. A moment at which one of the ultrasonic signal receivers receives the ultrasonic signal is assumed as t1. Locations of the strokes on the writing board 100 may be determined based on t1, the time intervals, and the distances between the individual ultrasonic signal receivers. Therefore, the first stroke and the second stroke are determined.

Figure 3A:
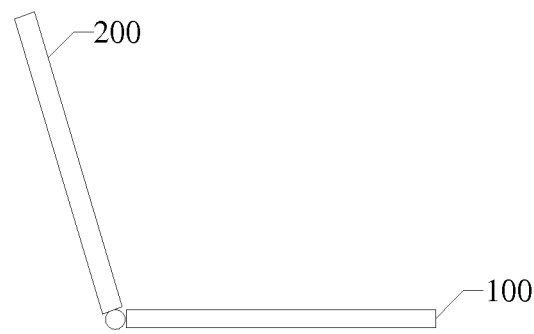
FIGS. 3(a), 3(b) and 3(c) are schematic diagrams showing modes of an existing electronic device.
Figure 3B:
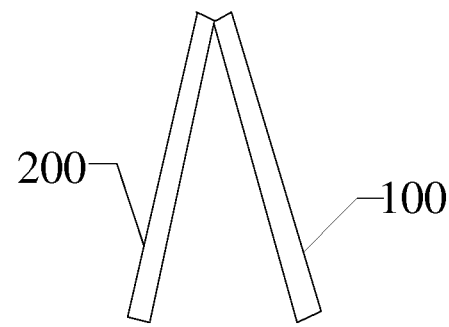
Figure 3C:
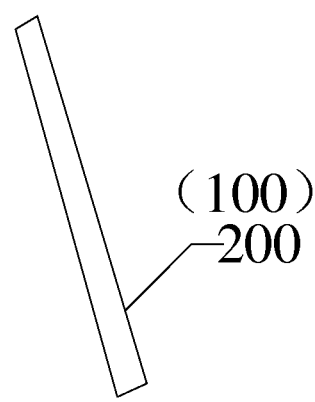

In addition, generally, the electronic device may have multiple modes such as laptop mode, tent mode and PAD mode. FIGS. 3(a) to 3(c) are schematic diagrams showing modes of the electronic device. As shown in FIG. 3(a), the electronic device is in a laptop mode; as shown in FIG. 3(b), the electronic device is in a tent mode; and as shown in FIG. 3(c), the keyboard 100 and the display screen 200 of the electronic device are put together as a whole and the electronic device is in a PAD mode.

In the case that the electronic device is in the laptop mode, the user may write on the keyboard 100 of the electronic device; hence, the keyboard 100 is used as the writing board. Alternatively, in the case that the electronic device is in the tent mode or the PAD mode, the user uses an external writing board, for example, the user may uses a paper as the writing board to write. In this situation, the paper is placed in front of the display screen 200, and when the user writes on the paper with the ultrasonic electronic stylus, the ultrasonic electronic stylus may generate a corresponding signal under a certain condition. The signal receiver provided on the display screen 200 of the electronic device may receive the signal, and determine, based on the signal, the stroke generated on the writing board by the ultrasonic electronic stylus; therefore, the electronic device acquires the stroke.

A Second Embodiment

Figure 4:
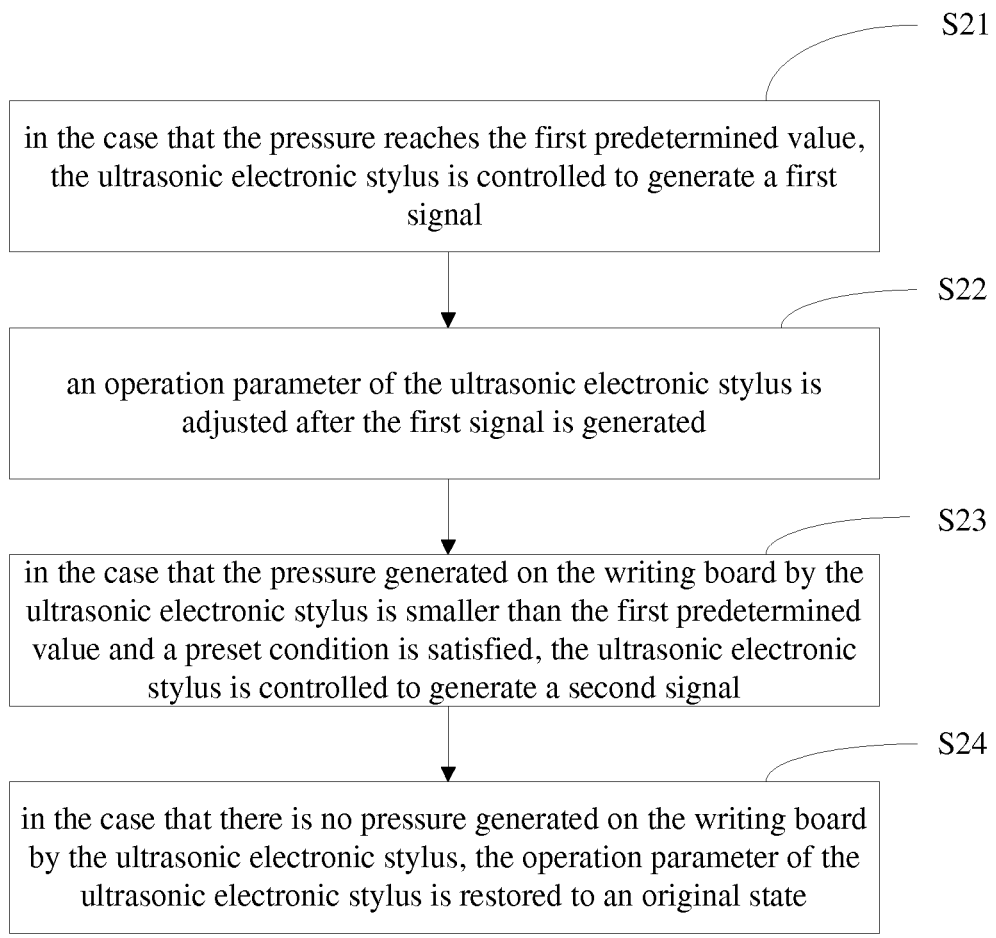
FIG. 4 is a schematic flowchart of a method for stroke acquisition according to another embodiment of the disclosure.

A method for stroke acquisition is provided in the disclosure. The method for stroke acquisition is applied to an ultrasonic electronic stylus. The ultrasonic electronic stylus is adapted to write on a writing board, and a pressure sensor is provided at the nib of the ultrasonic electronic stylus. Referring to the schematic flowchart as shown in FIG. 4, the method for stroke acquisition includes steps S21, S22, S23 and S24.

In the step S21, in the case that the ultrasonic electronic stylus contacts with the writing board, it is detected whether a pressure generated on the writing board by the ultrasonic electronic stylus reaches a first predetermined value, and in the case that the pressure reaches the first predetermined value, the ultrasonic electronic stylus is controlled to generate a first signal, so that a signal receiver of an electronic device receives the first signal and acquires, based on the received first signal, a first stroke generated by the ultrasonic electronic stylus on the writing board.

In the step S22, an operation parameter of the ultrasonic electronic stylus is adjusted after the first signal is generated. The operation parameter includes a threshold of the pressure sensor and/or a duration for a generated signal.

In the step 23, in the case that the pressure generated on the writing board by the ultrasonic electronic stylus is smaller than the first predetermined value, it is judged whether a preset condition is satisfied, and the ultrasonic electronic stylus is controlled to continue to generate a second signal if the preset condition is satisfied, so that the electronic device continues to acquire a second stroke based on the second signal.

Operations of the steps S21 to S23 are the same as the operations of steps S11 to S13 according to the first embodiment; hence, the operations of the steps S21 to S23 may be referred to the first embodiment, and are not further described here.

In the step S24, it is detected whether there is the pressure generated on the writing board by the ultrasonic electronic stylus, and in the case that there is no pressure generated on the writing board by the ultrasonic electronic stylus, the operation parameter of the ultrasonic electronic stylus is restored to an original state.

In writing, generally, the user may lift the nib when finishing one word or one radical, and then writes a next word or a next radical. In this situation, for some times, there is no pressure generated on the writing board by the ultrasonic electronic stylus. To avoid the waste of energy and unnecessary input of stroke data caused due to the fact that the ultrasonic electronic stylus continues generating the signal in this situation, the operation parameter of the ultrasonic electronic stylus is restored to the original state if it is detected that there is no pressure generated on the writing board by the ultrasonic electronic stylus.

With the operation in step S24, in the case that there is no pressure generated on the writing board by the ultrasonic electronic stylus, it is determined that a current writing operation is completed temporarily, and the operation parameter of the ultrasonic electronic stylus is adjusted to the original state; furthermore, for the next writing, the procedure returns to the step S21. Hence, unnecessary input of stroke data is avoided, and accordingly, the accuracy of stroke acquisition is further improved.

A Third Embodiment

Figure 5:
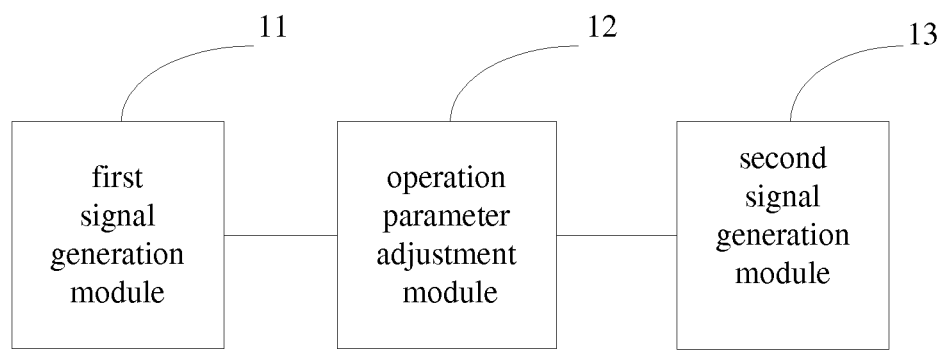
FIG. 5 is a schematic structural diagram of an apparatus for stroke acquisition according to an embodiment of the disclosure.

An apparatus for stroke acquisition is provided in the disclosure. The apparatus for stroke acquisition is applied to an ultrasonic electronic stylus. The ultrasonic electronic stylus is adapted to write on a writing board, and a pressure sensor is provided at the nib of the ultrasonic electronic stylus. Referring to the schematic structural diagram as shown in FIG. 5, the apparatus for stroke acquisition includes a first signal generation module 11, an operation parameter adjustment module 12 and a second signal generation module 13.

The first signal generation module 11 is adapted to, in the case that the ultrasonic electronic stylus contacts with the writing board, detect whether a pressure generated on the writing board by the ultrasonic electronic stylus reaches a first predetermined value, and control the ultrasonic electronic stylus to generate a first signal in the case that the pressure generated on the writing board by the ultrasonic electronic stylus reaches the first predetermined value, so that a signal receiver of an electronic device receives the first signal and acquires, based on the received first signal, a first stroke generated by the ultrasonic electronic stylus on the writing board.

The operation parameter adjustment module 12 is adapted to adjust an operation parameter of the ultrasonic electronic stylus after the first signal is generated. The operation parameter includes a threshold of the pressure sensor and/or a duration of a generated signal.

The second signal generation module 13 is adapted to, in the case that the pressure generated on the writing board by the ultrasonic electronic stylus is smaller than the first predetermined value, judge whether a preset condition is satisfied, and control the ultrasonic electronic stylus to continue to generate a second signal if the preset condition is satisfied, so that the electronic device continues to acquire a second stroke based on the second signal.

During stroke acquisition with the apparatus for stroke acquisition provided in the disclosure, since the operation parameter of the ultrasonic electronic stylus is adjusted after the first signal is generated, in the case that the pressure generated on the writing board by the ultrasonic electronic stylus is smaller than the first predetermined value, the ultrasonic electronic stylus may nevertheless be controlled to continue to generate the second signal, so that the electronic device continues to acquire the second stroke corresponding to the second signal. Therefore, loss of stroke data is avoided, and accordingly, the accuracy of stroke acquisition is improved.

Furthermore, in the case that the operation parameter adjusted by the operation parameter adjustment module is the threshold of the pressure sensor, the second signal generation module includes a second predetermined value judgment unit and a second signal generation unit.

The second predetermined value judgment unit is adapted to, in the case that the pressure generated on the writing board by the ultrasonic electronic stylus is smaller than the first predetermined value, judge whether the pressure generated on the writing board by the ultrasonic electronic stylus reaches a second predetermined value, where the second predetermined value is smaller than the first predetermined value.

The second signal generation unit is adapted to control the ultrasonic electronic stylus to continue to generate the second signal if the pressure generated by the ultrasonic electronic stylus reaches the second predetermined value, so that the electronic device continues to acquire the second stroke based on the second signal.

Alternatively, in the case that the operation parameter adjusted by the operation parameter adjustment module is the duration of the generated signal, the second signal generation module includes a duration judgment unit and a second signal generation unit.

The duration judgment unit is adapted to, in the case that the pressure generated on the writing board by the ultrasonic electronic stylus is smaller than the first predetermined value, judge whether a duration of the second signal generated by the ultrasonic electronic stylus reaches a set duration.

The second signal generation unit is adapted to control the ultrasonic electronic stylus to continue generating the second signal if the duration of the second signal generated by the ultrasonic electronic stylus does not reach the set duration, so that the electronic device continues to acquire the second stroke based on the second signal.

The apparatus for stroke acquisition further includes a restoring module.

The restoring module is adapted to detect whether there is the pressure generated on the writing board by the ultrasonic electronic stylus, and in the case that there is no pressure generated on the writing board by the ultrasonic electronic stylus, restore the operation parameter of the ultrasonic electronic stylus to an original state.

With the restoring module, in the case that there is no pressure generated on the writing board by the ultrasonic electronic stylus, it is determined that a current writing operation is completed temporarily. The operation parameter of the ultrasonic electronic stylus is restored to the original state. The procedure returns to the operation of the first signal generation module, to perform a next writing operation. Therefore, unnecessary input of stroke data is avoided, and accordingly, the accuracy of stroke acquisition is further improved.

Accordingly, an ultrasonic electronic stylus is further provided in the disclosure. The above-described apparatus for stroke acquisition is integrated in a processor of the ultrasonic electronic stylus.

When using the ultrasonic electronic stylus provided in the disclosure to write, since the operation parameter of the ultrasonic electronic stylus is adjusted after the first signal is generated, the ultrasonic electronic stylus may nevertheless be controlled to continue to generate the second signal in the case that the pressure generated on the writing board by the ultrasonic electronic stylus is smaller than the first predetermined value, so that the electronic device continues to acquire the second stroke corresponding to the second signal. Therefore, loss of stroke data is avoided, and accordingly, the accuracy of stroke acquisition is improved.

It should be understood by those skilled in the art that, exemplary units and arithmetic steps described in conjunction with the embodiments of the disclosure may be implemented with electronic hardware or a combination of computer software and electronic hardware. Whether these functions are implemented through hardware or software is depended on specific applications and design constraints of the technical solutions. For respective specific applications, different approaches may be used by those skilled in the art to implement the described functions, and such implementation should fall in the scope of the disclosure.

It can be clearly understood by those skilled in the art that, for convenience and briefness of description, processes of the described system, apparatus and units may be referred to corresponding processes according to the foregoing method embodiments of the disclosure, and are not further described here.

It should be understood that, according to the embodiments of the disclosure, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

The units described as separate components may be or not be separated physically. The components shown as units may either be or not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit.

If the functions are implemented in the form of software function unit and the software function unit is sold or used as separate products, the software function unit may also be stored in a computer readable storage medium. Based on such understanding, the technical solutions of the disclosure, part of the disclosure that contributes to existing technologies or part of the technical solutions may be embodied in the form of a computer software product. The computer software product is stored in a storage medium and includes several instructions for instructing a computer device (which may be personal computer, server, network device or the like) to implement all of or part of the steps of the methods according to the embodiments of the disclosure. The foregoing storage medium includes various media that can store program codes, for example, USB disk, mobile hard disk drive, Read-Only Memory (ROM), Random Access Memory (RAM), magnetic disk, optical disk and the like.

With the above description of the embodiments of the disclosure, the disclosure may be implemented or used by those skilled in the art. Various modifications to the embodiments are apparent to those skilled in the art, and the general principle defined in the disclosure may be implemented with other embodiments without departing from the spirit or scope of the disclosure. Therefore, the disclosure is not limited to the described embodiments, but claims a widest scope consistent with the principle and novel features of the disclosure.

The invention claimed is:

1. A method for stroke acquisition, applied to an ultrasonic electronic stylus, wherein the ultrasonic electronic stylus is adapted to write on a writing board, a pressure sensor is provided at a nib of the ultrasonic electronic stylus, the method comprises:

in the case that the ultrasonic electronic stylus contacts with the writing board, detecting whether a pressure generated on the writing board by the ultrasonic electronic stylus reaches a first predetermined value, and in the case that the pressure generated on the writing board by the ultrasonic electronic stylus reaches the first predetermined value, controlling the ultrasonic electronic stylus to generate a first signal, so that a signal receiver of an electronic device receives the first signal and acquires, based on the first signal, a first stroke generated by the ultrasonic electronic stylus on the writing board;

adjusting an operation parameter of the ultrasonic electronic stylus after the first signal is generated, wherein the operation parameter comprises a threshold of the pressure sensor and/or a duration of a generated signal; and in the case that the pressure generated on the writing board by the ultrasonic electronic stylus is smaller than the first predetermined value, judging whether a preset condition is satisfied and controlling the ultrasonic electronic stylus to continue to generate a second signal if the preset condition is satisfied, so that the electronic device continues to acquire a second stroke based on the second signal.

2. The method according to claim 1, wherein in the case that the operation parameter subjected to adjusting is the threshold of the pressure sensor, judging whether the preset condition is satisfied and controlling the ultrasonic electronic stylus to continue to generate the second signal if the preset condition is satisfied comprise:

in the case that the pressure generated on the writing board by the ultrasonic electronic stylus is smaller than the first predetermined value, judging whether the pressure generated on the writing board by the ultrasonic electronic stylus reaches a second predetermined value, the second predetermined value being smaller than the first predetermined value; and if the pressure generated by the ultrasonic electronic stylus reaches the second predetermined value, controlling the ultrasonic electronic stylus to continue to generate the second signal, so that the electronic device continues to acquire the second stroke based on the second signal.

3. The method according to claim 1, wherein in the case that the operation parameter subjected to adjusting is the duration of the generated signal, judging whether the preset condition is satisfied and controlling the ultrasonic electronic stylus to continue to generate the second signal if the preset condition is satisfied comprise:

in the case that the pressure generated on the writing board by the ultrasonic electronic stylus is smaller than the first predetermined value, judging whether a duration of the second signal generated by the ultrasonic electronic stylus reaches a set duration; and if the duration of the second signal generated by the ultrasonic electronic stylus does not reach the set duration, controlling the ultrasonic electronic stylus to continue generating the second signal, so that the electronic device continues to acquire the second stroke based on the second signal.

4. The method according to claim 1, wherein in the case that the signal receiver of the electronic device comprises an infrared signal receiver and an ultrasonic signal receiver, the first signal and the second signal comprise an infrared signal and an ultrasonic signal.

5. The method according to claim 1, wherein in the case that the signal receiver of the electronic device is an ultrasonic signal receiver, the first signal and the second signal are ultrasonic signals.

6. The method according to claim 1, wherein after the operation parameter of the ultrasonic electronic stylus is adjusted, the method further comprises:

detecting whether there is the pressure generated on the writing board by the ultrasonic electronic stylus, and in the case that there is no pressure generated on the writing board by the ultrasonic electronic stylus, restoring the operation parameter of the ultrasonic electronic stylus to an original state.

7. An apparatus for stroke acquisition, applied to an ultrasonic electronic stylus, the ultrasonic electronic stylus is adapted to write on a writing board, a pressure sensor is provided at a nib of the ultrasonic electronic stylus, the apparatus for stroke acquisition comprises a processor and a computer readable storage medium, wherein a plurality of instructions are stored in the computer readable storage medium and the plurality of instructions, when being executed by the processor, cause the processor to:

in the case that the ultrasonic electronic stylus contacts with the writing board, detect whether a pressure generated on the writing board by the ultrasonic electronic stylus reaches a first predetermined value, and in the case that the pressure generated on the writing board by the ultrasonic electronic stylus reaches the first predetermined value, control the ultrasonic electronic stylus to generate a first signal, so that a signal receiver of an electronic device receives the first signal and acquires, based on the first signal, a first stroke generated by the ultrasonic electronic stylus on the writing board;

adjust an operation parameter of the ultrasonic electronic stylus after the first signal is generated, wherein the operation parameter comprises a threshold of the pressure sensor and/or a duration of a generated signal; and in the case that the pressure generated on the writing board by the ultrasonic electronic stylus is smaller than the first predetermined value, judge whether a preset condition is satisfied and control the ultrasonic electronic stylus to continue to generate a second signal if the preset condition is satisfied, so that the electronic device continues to acquire a second stroke based on the second signal.

8. The apparatus according to claim 7, wherein in the case that the operation parameter is the threshold of the pressure sensor, the plurality of instructions, when being executed by the processor, cause the processor to:

in the case that the pressure generated on the writing board by the ultrasonic electronic stylus is smaller than the first predetermined value, judge whether the pressure generated on the writing board by the ultrasonic electronic stylus reaches a second predetermined value, the second predetermined value being smaller than the first predetermined value; and control the ultrasonic electronic stylus to continue to generate the second signal if the pressure generated by the ultrasonic electronic stylus reaches the second predetermined value, so that the electronic device continues to acquire the second stroke based on the second signal.

9. The apparatus according to claim 7, wherein in the case that the operation parameter is the duration of the generated signal, the plurality of instructions, when being executed by the processor, cause the processor to:

in the case that the pressure generated on the writing board by the ultrasonic electronic stylus is smaller than the first predetermined value, judge whether a duration of the second signal generated by the ultrasonic electronic stylus reaches a set duration; and control the ultrasonic electronic stylus to continue generating the second signal if the duration of the second signal generated by the ultrasonic electronic stylus does not reach the set duration, so that the electronic device continues to acquire the second stroke based on the second signal.

10. The apparatus according to claim 7, wherein the plurality of instructions, when being executed by the processor, further cause the processor to:
  detect whether there is the pressure generated on the writing board by the ultrasonic electronic stylus, and in the case that there is no pressure generated on the writing board by the ultrasonic electronic stylus, restore the operation parameter of the ultrasonic electronic stylus to an original state.

11. An ultrasonic electronic stylus, wherein an apparatus for stroke acquisition is integrated in a processor of the ultrasonic electronic stylus, the ultrasonic electronic stylus is adapted to write on a writing board, and a pressure sensor is provided at a nib of the ultrasonic electronic stylus;
  wherein the apparatus for stroke acquisition comprises a processor and a computer readable storage medium, wherein a plurality of instructions are stored in the computer readable storage medium and the plurality of instructions, when being executed by the processor of the apparatus, cause the processor of the apparatus to:
    in the case that the ultrasonic electronic stylus contacts with the writing board, detect whether a pressure generated on the writing board by the ultrasonic electronic stylus reaches a first predetermined value, and in the case that the pressure generated on the writing board by the ultrasonic electronic stylus reaches the first predetermined value, control the ultrasonic electronic stylus to generate a first signal, so that a signal receiver of an electronic device receives the first signal and acquires, based on the first signal, a first stroke generated by the ultrasonic electronic stylus on the writing board;
    adjust an operation parameter of the ultrasonic electronic stylus after the first signal is generated, wherein the operation parameter comprises a threshold of the pressure sensor and/or a duration of a generated signal; and
    in the case that the pressure generated on the writing board by the ultrasonic electronic stylus is smaller than the first predetermined value, judge whether a preset condition is satisfied and control the ultrasonic electronic stylus to continue to generate a second signal if the preset condition is satisfied, so that the electronic device continues to acquire a second stroke based on the second signal.

* * * * *